(12) United States Patent
Winiarski

(10) Patent No.: US 11,449,497 B1
(45) Date of Patent: Sep. 20, 2022

(54) METHOD AND SYSTEM FOR IMPLEMENTING DYNAMIC STORED PROCEDURES

(71) Applicant: JPMorgan Chase Bank, N.A., NY, NY (US)

(72) Inventor: Robert A. Winiarski, Valrico, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 392 days.

(21) Appl. No.: 15/790,376

(22) Filed: Oct. 23, 2017

Related U.S. Application Data

(60) Provisional application No. 62/411,083, filed on Oct. 21, 2016.

(51) Int. Cl.
| | | |
|---|---|---|
| *G06F 16/00* | (2019.01) | |
| *G06F 16/242* | (2019.01) | |
| *G06F 16/22* | (2019.01) | |
| *G06F 16/2457* | (2019.01) | |

(52) U.S. Cl.
CPC ...... *G06F 16/2443* (2019.01); *G06F 16/2282* (2019.01); *G06F 16/2438* (2019.01); *G06F 16/24573* (2019.01)

(58) Field of Classification Search
CPC ........... G06F 16/2443; G06F 16/24573; G06F 16/2282; G06F 16/2438; G06F 17/30864; G06F 17/30867; G06F 17/30286; G06F 17/30595; G06F 8/315; G06Q 30/02
See application file for complete search history.

(56) References Cited

U.S. PATENT DOCUMENTS

| | | | |
|---|---|---|---|
| 4,395,757 A | | 7/1983 | Bienvenu |
| 6,006,220 A | * | 12/1999 | Haderle ............ G06F 16/24545 |
| 6,044,216 A | * | 3/2000 | Bhargava .................. G06F 8/31 |
| | | | 717/114 |
| 7,389,256 B1 | | 6/2008 | Adams |
| 9,690,577 B1 | | 6/2017 | Crew |

(Continued)

OTHER PUBLICATIONS

Teng Yingyan, He Zonggang, Design and Implementation of Stored Procedure Router Based on Dynamic SQL, 2009 International Forum on Information Technology and Applications (Year: 2000).*

(Continued)

*Primary Examiner* — Ashish Thomas
*Assistant Examiner* — Suman Rajaputra
(74) *Attorney, Agent, or Firm* — Greenblum & Bernstein, P.L.C.

(57) ABSTRACT

The invention relates to a creating a stored procedure that retrieves its queries from a database, e.g., a DB2 table, and then prepares and executes dynamic SQL based on parameters supplied by a calling program. According to an embodiment of the present invention, a computer implemented system implements a dynamic stored procedure tool and comprises: a memory interface that accesses a database table; an interactive interface that receives a user selection; a processor, coupled to the memory interface and the interactive interface, the processor configured to perform the steps comprising: retrieve input values from a calling program; retrieve a cursor from an external source, using the input values; determine whether one or more parameter substitutions are applicable; and execute the cursor dynamically.

18 Claims, 6 Drawing Sheets

(56) References Cited

U.S. PATENT DOCUMENTS

| | | |
|---|---|---|
| 9,843,532 B1 | 12/2017 | Shani |
| 10,545,957 B1* | 1/2020 | Winiarski ............. G06F 16/248 |
| 2001/0037224 A1 | 11/2001 | Eldridge |
| 2002/0161748 A1* | 10/2002 | Hamel .................. G06F 16/254 |
| 2005/0256834 A1 | 11/2005 | Millington |
| 2005/0278697 A1* | 12/2005 | Hodge .................... G06F 8/315 |
| | | 717/115 |
| 2006/0004745 A1 | 1/2006 | Kuhn |
| 2007/0208695 A1 | 9/2007 | Burger |
| 2007/0282837 A1 | 12/2007 | Klein |
| 2008/0016047 A1* | 1/2008 | Dettinger ............ G06F 16/2471 |
| 2008/0098033 A1 | 4/2008 | Farrar |
| 2008/0104151 A1 | 5/2008 | Tanaka |
| 2011/0029321 A1 | 2/2011 | Rourke |
| 2011/0113054 A1 | 5/2011 | McLean |
| 2011/0161371 A1* | 6/2011 | Thomson ............ G06F 16/2428 |
| | | 707/792 |
| 2012/0198416 A1 | 8/2012 | Sirr |
| 2013/0138626 A1 | 5/2013 | Delafranier |
| 2013/0204450 A1 | 8/2013 | Kagan |
| 2014/0157154 A1 | 6/2014 | Brunswig |
| 2015/0046856 A1 | 2/2015 | Rucker |
| 2016/0283584 A1 | 9/2016 | Dubost |
| 2017/0017962 A1 | 1/2017 | Knoblauch |
| 2019/0080340 A1 | 3/2019 | Berger |

OTHER PUBLICATIONS

U.S. Appl. No. 16/170,777, filed Oct. 2018, Winiarski; Robert A.

* cited by examiner

Start Parameters

| Include | Name | Description | Type | Value |
|---|---|---|---|---|
| ✓ | @SYSTEM_ID | | Char | C |
| ✓ | @STORPROC_NAME | | Char | CIFSP003 |
| ✓ | @QUERY_ID | | Char | IDTST00100 |
| ✓ | @QUERY_PARSING | | | |
| ✓ | @QUERY_VALUES | | VarChar | TEL_CITY=MIAMI;TEL_STATE=FL;TEL_LAST_NAME=SMITH; |
| ✓ | @ROWS_TO_FETCH | | Integer | 0 |
| ✓ | @RESP_TYPE | | Char | |

| TEL_PHONE_NUMBER* | TEL_FIRST_NAME* | TEL_LAST_NAME* | TEL_STREET_ADDR* | TEL_CITY* | TEL_STATE* | TEL_ZIP_CODE* |
|---|---|---|---|---|---|---|
| 800-555-1212 | ANNE | SMITH | 123 MAIN ST | MIAMI | FL | 33333 |
| 800-555-2222 | BARBARA | SMITH | 456 OAK ST | MIAMI | FL | 33333 |
| 800-555-3333 | CAROL | SMITH | 789 ELM ST | MIAMI | FL | 33333 |
| 800-555-4444 | DEBORAH | SMITH | 1000 PINE ST | MIAMI | FL | 33333 |
| 800-555-5555 | EVELYN | SMITH | 2000 MAPLE ST | MIAMI | FL | 33333 |

Figure 6

METHOD AND SYSTEM FOR IMPLEMENTING DYNAMIC STORED PROCEDURES

CROSS REFERENCE TO RELATED APPLICATIONS

The application claims priority to U.S. Provisional Application 62/411,083, filed Oct. 21, 2016, the contents of which are incorporated herein in its entirety. This application is also related to application U.S. Ser. No. 15/643,569, filed Jul. 7, 2017, which claims priority to U.S. Provisional Application 62/359,774, filed Jul. 8, 2016, the contents of which are incorporated herein in their entirety.

FIELD OF THE INVENTION

The present invention generally relates to dynamically creating and modifying result sets of stored procedures.

BACKGROUND OF THE INVENTION

Creating and modifying stored procedures is often labor-intensive and time-consuming. Whenever a client requests a new stored procedure, a first technical task involves having the Database Administrator (DBA) team define it. The Application Development teams do not have the ability to define stored procedures themselves.

Once the DBA team has defined the stored procedure, a developer can begin coding the program. Stored procedures in applications (e.g., CIF—Customer Information Facility) generally return data to clients by opening a cursor on a DB2 table(s) and then returning control to the calling program. The client's program then processes the cursor from the CIF stored procedure by fetching rows from the result set. In current processes, the underlying cursor is hard-coded inside the stored procedure.

A drawback is that the cursor cannot be changed unless the stored procedure itself is changed. In fact, the stored procedure must be brought into a change management utility in order to be edited. In the event the stored procedure processes different cursors for different clients, current systems will have to perform regression testing with all of them even though only one client may truly be affected by the change.

In addition, it is common practice to recompile a stored procedure if it includes a DCLGEN (Declarations Generator) for a table that is being changed. For example, the DCLGEN may list each column in a particular DB2 table along with its data type and size. The DCLGEN may also contain equivalent information in a format usable by a programming language in question (e.g., COBOL). A new column being added to a table may not be needed by a given stored procedure, but current systems may opt to always recompile the stored procedure in order to err on the side of caution. This extra precaution is common practice and results in an extra program to the release which must be tested by AD, QA, UAT, and the client(s) who use them.

Some stored procedures may execute the same cursor and return the same data to each calling application. In some circumstances, there may be a request from one of those applications to make a change so the cursor will return additional data. In this case, all the other applications using the stored procedure must also agree to the change. In addition, the other applications must agree to make and test changes to their own code in order to accommodate a request they may have no interest in. If the other applications are unable, or unwilling, to go along with the requested change, then the request will be either denied or a brand new stored procedure just for this request will need to be created. This newly created stored procedure would naturally need to be maintained in perpetuity.

These and other drawbacks exist.

SUMMARY OF THE INVENTION

Accordingly, one aspect of the invention is to address one or more of the drawbacks set forth above. According to an embodiment of the present invention, a computer implemented system implements a dynamic stored procedure tool. The system comprises: a memory interface that accesses a database table; an interactive interface that receives a user selection; a processor, coupled to the memory interface and the interactive interface, the processor configured to perform the steps comprising: retrieve input values from a calling program; retrieve a cursor from an external source, using the input values; determine whether one or more parameter substitutions are applicable; and execute the cursor dynamically.

According to another embodiment of the present invention, a computer implemented method implements a dynamic stored procedure tool. The method comprises the steps of: retrieving, via a processor, input values from a calling program; retrieving, via the processor, a cursor from an external source, using the input values; determining, via the processor, whether one or more parameter substitutions are applicable; and executing, via the processor, the cursor dynamically; wherein the processor is coupled to a memory interface and an interactive interface.

The computer implemented system, method and medium described herein provide unique advantages to entities, organizations and other users (e.g., developers, quality assurance teams, testing departments, etc.), according to various embodiments of the invention. Traditional stored procedures need to be recompiled whenever the cursor is changed because the cursor is defined inside the program. Moreover, traditional stored procedures also need to be recompiled even if the structure of an underlying DB2 table is changed. In contrast, the stored procedure of an embodiment of the present invention has no such requirement because the information is retrieved and/or accessed in real-time. Accordingly, the features of an embodiment of the present invention may achieve tremendous savings in time and resources for users and business partners. These and other advantages will be described more fully in the following detailed description.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

FIG. 3 is an exemplary illustration of a dynamic stored procedure tool interface, according to an embodiment of the present invention.

FIG. 6 is an exemplary illustration of a result set interface, according to an embodiment of the present invention.

DESCRIPTION OF EMBODIMENTS OF THE INVENTION

Figure 1:
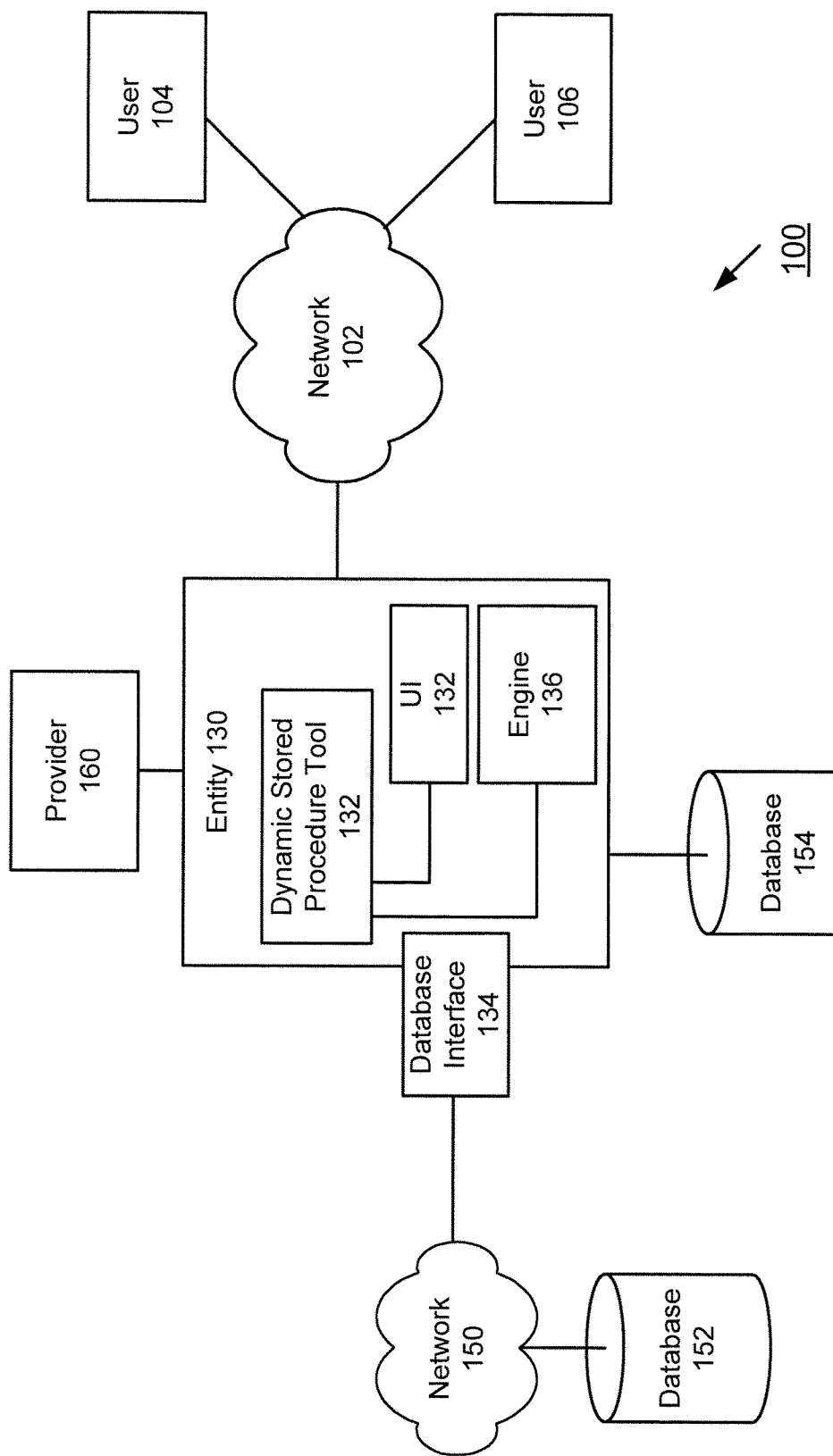
FIG. 1 is an exemplary system diagram for implementing a Dynamic Stored Procedure Tool, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to creating a stored procedure that retrieves its queries from a database, e.g., a DB2 table, and then prepares and executes dynamic SQL based on parameters supplied by a calling program. The innovative procedure addresses the need to create a separate stored procedure every time a client has a requirement for a brand new data feed from CIF, for example. The system addresses the need to modify a stored procedure simply to make a change to a result set or other type of modification. The innovative procedure provides increased flexibility, reduced development and maintenance time, and increased speed-to-market.

A stored procedure may represent a specialized program. A stored procedure may represent a compiled program that can execute SQL statements and is stored at a local or remote database server. For example, an entity may manage a customer information facility that provides data warehousing, where many different applications call various stored procedures. For example, an application may execute a stored procedure to retrieve a name and an address for a set of accounts by passing account identifiers. According to an exemplary illustration, the entity may execute 50, 60, 70 stored procedures on thousands and thousands of test cases.

For example, a stored procedure may be invoked from an application program or from the command line processor. A single call to a stored procedure from a client application may access the database at the server several times. A typical stored procedure may contain two or more SQL statements and some manipulative or logical processing in a host language or SQL procedure statements. Stored procedures may be called from other applications or from the command line.

For each test case, the system may call an appropriate stored procedure using the specified parameters. The program may display the test result output in addition to any available result sets, e.g., DB2 Result Sets, that the stored procedure creates. The results may then be saved by the user for documentation and/or auditing purposes, etc. Also, the results may be exported to another application, communicated to recipients, programs, systems, and further available for download by a user. Result sets may represent information from different tables, sources, etc. Also, result sets may represent results of a stored procedure in a particular format and may be further filtered or processed. For example, the stored procedure may process the result sets and display the information in an audit trail or other output.

An embodiment of the present invention is directed to a stored procedure that takes input values supplied by a calling program and uses them to retrieve an appropriate cursor dynamically from an external source, such as a dedicated DB2 table (e.g., T_STORPROC_QUERY_DATA). A cursor may represent a set of SQL statements. In contrast, prior conventional systems maintain hard-coded cursors in the program. According to an embodiment of the present invention, the individual lines of SQL that make up the cursor may be stored in the table where the dedicated table may be modified separately. With the exception of boilerplate SQL statements that are used for housekeeping purposes, the cursors executed by the stored procedure may come from this dedicated DB2 table.

Using the input values from the calling program, the stored procedure of an embodiment of the present invention may retrieve the right cursor from the dedicated table in real-time. An embodiment of the present invention may then perform any necessary parameter substitution and then execute the cursor dynamically. If a client wants a change to the data being returned to them, it is no longer needed to edit the program to accomplish this. Rather, the innovative system may update the cursor in the dedicated table and then have the stored procedure execute the new version of the cursor. Moreover, the system does not require recompiling the stored procedure.

In addition, an embodiment of the present invention may be designed to process multiple queries and return multiple result sets to a calling program. For example, an application (e.g., GFP—Global Funds Processor) may call several stored procedures during a start-of-day process. This may be reduced to a single call to a stored procedure of an embodiment of the present invention which would then return a required number of result sets.

Onboarding a new client, or adding another result set for an existing one, may be as simple as adding a query to the DB2 table along with any other supporting SQL statements.

Accordingly, the stored procedure of an embodiment of the present invention dramatically reduces development and maintenance time.

For example, one application may be requesting a change to a common stored procedure and other impacted applications may be unable to change and test their own code in a timely manner. In this scenario, conventional systems would frequently have to create a new stored procedure for the requesting application to handle this request. However, by using the stored procedure of an embodiment of the present invention, a new cursor may be created and executed to handle the request, which may be done in a timely manner, and only the first application may need to make and test changes to the code. The other applications may continue to use the original cursor, where regression testing may be avoided.

According to an embodiment of the present invention, the stored procedure may be dynamic. It does not need to know anything ahead of time about the cursor it will execute or the data it will return to the calling application.

When the stored procedure is invoked, the calling application may pass in two main items. The first item may include a Cursor-ID or other identifier. This allows the system to identify the specific cursor to execute. The second item may include a list of values the program may use for this particular invocation of the cursor. For example, the list may contain an account number that the cursor may use to return data for a customer. The stored procedure may use the Cursor-ID to retrieve the cursor (e.g., a set of SQL statements) from the dedicated DB2 table in real-time. Any particular values (e.g., account number, etc.) for this invocation may be applied and then the program may execute the cursor.

According to an embodiment, the system may include an interactive user interface that may be accessible through various user devices, computer, laptop, smartphone, mobile devices, etc. The interface may include a web front-end to view and access ready-to-use cursors. With this feature, users may view predetermined ready-to-use cursors that may be generated and applied in real-time. The interface may also demonstrate the required input values for each cursor and provide sample output data.

FIG. 1 is an exemplary system diagram for implementing a Dynamic Stored Procedure Tool, according to an embodiment of the present invention. As illustrated in FIG. 1, Network 102 may be communicatively coupled with one or more data devices including, for example, computing devices associated with end users, represented by User 104, 106. Such devices may include mobile devices, including mobile phones, smart devices, etc. Entity 130 may include a Dynamic Stored Procedure Tool 132 that automates and facilitates execution and testing of stored procedures in accordance with the various embodiments of the present invention. Dynamic Stored Procedure Tool 132 may also incorporate modules and other functions, such as User Interface 142, Database Interface 144 and Engine 146. These modules are exemplary and illustrative, Dynamic Stored Procedure Tool 132 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Stored procedures may be stored and maintained by Databases 152, 154. For example, Database 152 may maintain stored procedures and corresponding parameters for each stored procedure at a remote location, accessible by Network 150. Database 152 may receive updates, revisions, requests and/or other actions on the data stored via Database Interface 134. The updates may be automatically implemented from various sources, applications, and systems. Also, Databases 152, 154 may also store and maintain output data in various formats as well as reports, performance data, etc. The Dynamic Stored Procedure Tool described herein may be provided by Entity 130 and/or a third party provider, represented by 160, where Provider 160 may operate with Entity 130.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 100 may be referenced in explaining the exemplary methods described herein.

Network 102, 150 may be a wireless network, a wired network or any combination of wireless network and wired network. For example, Network 102, 150 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Network 102, 150 may support an Internet network, a wireless communication network, a cellular network, Bluetooth, or the like, or any combination thereof. Network 102, 150 may further include one, or any number of the exemplary types of networks mentioned above operating as a stand-alone network or in cooperation with each other. Network 102, 150 may utilize one or more protocols of one or more network elements to which it is communicatively coupled. Network 102, 150 may translate to or from other protocols to one or more protocols of network devices. Although Network 102 and 150 are each depicted as one network for simplicity, it should be appreciated that according to one or more embodiments, Network 102, 150 may comprise a plurality of interconnected networks, such as, for example, a service provider network, the Internet, a cellular network, corporate networks, or even home networks, or any of the types of networks mentioned above.

Data may be transmitted and received via Network 102, 150 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 illustrates individual devices or components, it should be appreciated that there may be several of such devices to carry out the various exemplary embodiments. Entity 130 may communicate using any mobile or computing device, such as a laptop computer, a personal digital assistant, a smartphone, a smartwatch, smart glasses, other wearables or other computing devices capable of sending or receiving network signals. User devices may have an application installed that is associated with Entity 130.

Entity 130 may be communicatively coupled to Databases 152, 154, via Database Interface 134. These storage components may include any suitable data structure to maintain the information and allow access and retrieval of the information. For example, the storage components may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

The storage may be local, remote, or a combination. The storage components may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The storage components may have back-up capability built-in. Communications with the storage components may be over a network, such as Network 102, or communications may involve a direct connection between the various storage components and Entity 130, as depicted in FIG. 1. The storage components may also represent cloud or other network based storage.

Figure 2:
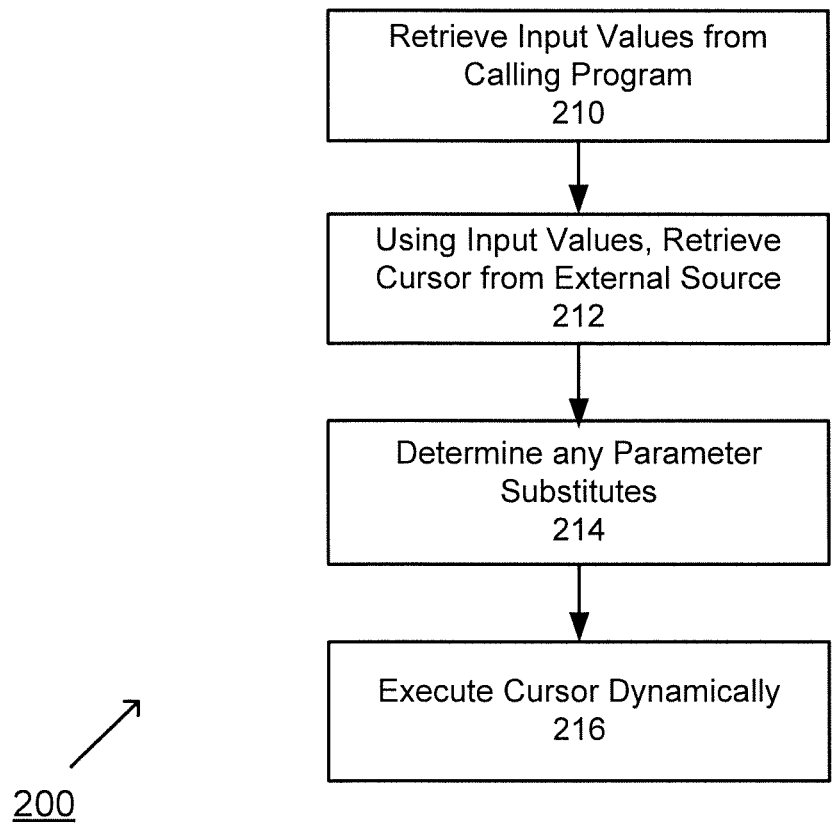
FIG. 2 is an exemplary flowchart for implementing a Dynamic Stored Procedure Tool, according to an embodiment of the present invention.

FIG. 2 is an exemplary flowchart for implementing a Dynamic Stored Procedure Tool, according to an embodiment of the present invention. At step 210, the system may retrieve input values from a calling program. At step 212, using the input values, the system may retrieve a cursor from an external source. The external source may include a table that stores individual lines of SQL that make up the cursor. At step 214, the system may determine whether any parameter substitutions should be implemented. Other modifications may be identified and implemented. At step 216, the system may then execute the cursor dynamically. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. The details of the steps are described below.

FIG. 3 is an exemplary illustration of a dynamic stored procedure tool interface, according to an embodiment of the present invention. FIG. 3 uses an exemplary DB2 table named T_TELEPHONE. In this example, a query returns account information for every customer where the city, state, and last name match the values provided by a calling application. This example may list all customers in Miami, Fla. whose last name is "Smith." The dedicated DB2 table may contain all the data needed in order to build and/or execute a query and return the result set to the calling application.

FIG. 3 is an example of how to call stored procedure CIFSP003. QUERY_ID identifies a starting point for building the query. QUERY_VALUES supplies names/values for dynamic parameter substitution at run-time. Table T_STOR-PROC_QUERY_DATA (SQD) stores all the data that CIFSP003 may use to build a query.

FIG. 3 illustrates the input parameters, such as the QUERY_ID parameter. This parameter value is used to identify which query (or queries) stored procedure CIFSP003 will execute. In addition, this value serves as a starting point to identify related rows.

As shown by 312, the QUERY_ID is represented as IDTST00100. The first two characters, "ID" of (IDTST00100), represent a particular subset of rows in the SQD table. The next six characters, "TST001" of (IDTST00100), represent a common thread that stored procedure CIFSP003 uses to identify all the related rows it needs in order to build and execute the query.

Figure 4:
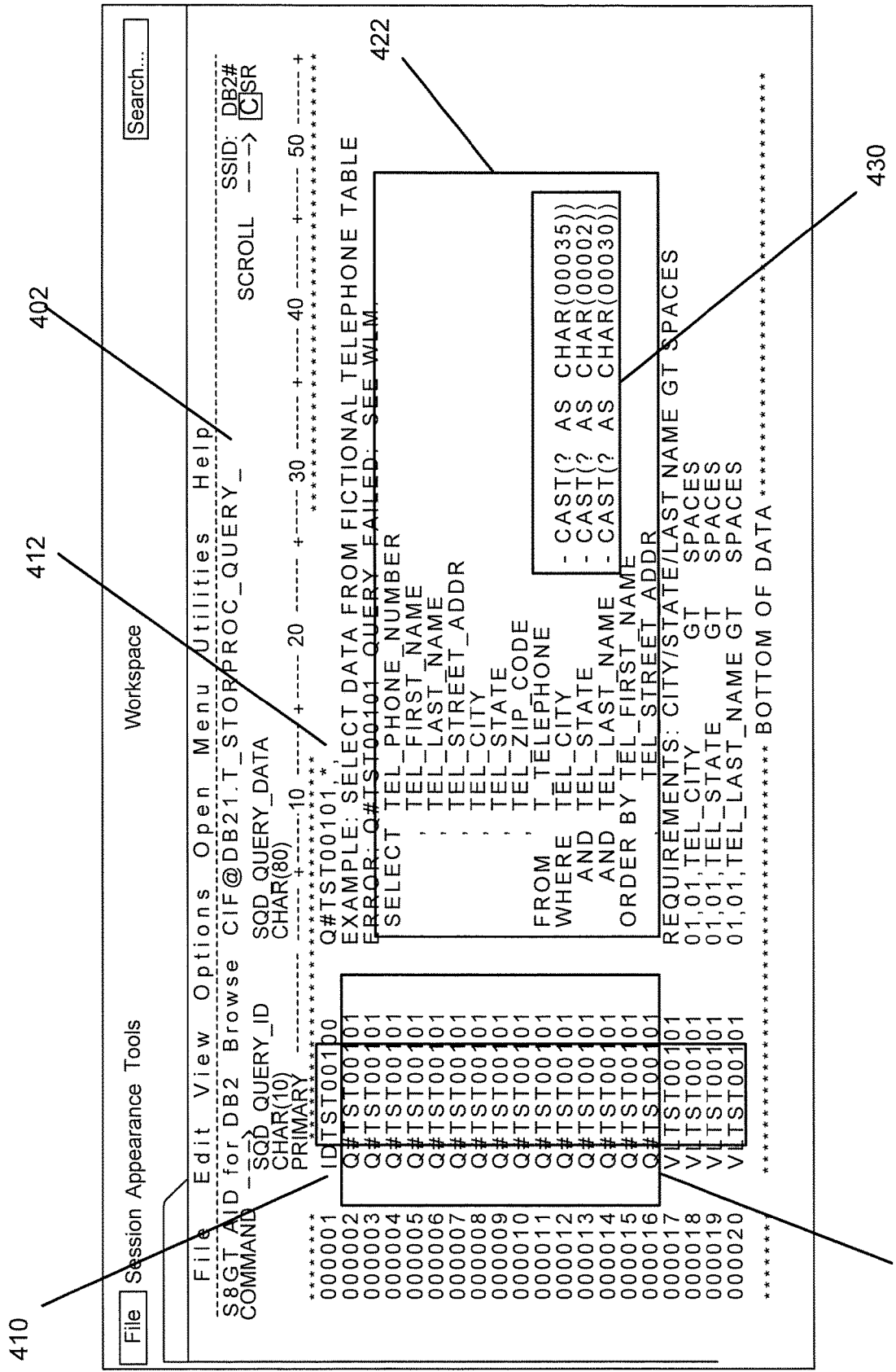
FIG. 4 is an exemplary illustration of a dynamic stored procedure tool interface, according to an embodiment of the present invention.

FIG. 4 is an exemplary illustration of a dynamic stored procedure tool interface, according to an embodiment of the present invention. As shown in FIG. 4, DB2 Table T_STOR-PROC_QUERY_DATA (SQD) represents a dedicated table that stores underlying data that stored procedure CIFSP003 needs to build and execute a query. The Table is identified at 402.

As shown in FIG. 4, 420 represents the common thread of TST001 in the rows. These are the rows in the SQD table that are related to the input parameter value of IDTST00100.

An embodiment of the present invention is directed to how stored procedure CIFSP003 takes the input parameter values and extracts the query. FIG. 3 illustrates the input parameter values, 312, that the calling application would supply.

An embodiment of the present invention first uses the QUERY_ID input parameter, 312, value to identify the query that CIFSP003 may build and execute.

As identified by 410, the name of the query is Q#TST00101, as shown at 412.

The query name, 412, is then used to read the SQD table again, as represented by 420. The body of the query Q#TST00101 is shown at 422. Query 422 may include specifics that relate to "Select," "From," "Where," "And" and "Order by." In this example, query 422 indicates what parameters to select by the "Select" statement. Query 422 further identifies which table to access, as identified by the "From" statement. Specific conditions may be defined by a combination of "Where" and "And" statements. An order may be identified by an "Order By" statement. According to an embodiment of the present invention, Query 422 may represent a cursor.

Fields identified by 430 represent Typed Parameter Markers. The question mark ("?") in each one tells DB2 that a parameter is being used. All that remains is for stored procedure CIFSP003 to provide DB2 the mapping between the Typed Parameter Markers and the actual data from the calling application.

Each question mark ('?') in 430 represents a Parameter Marker. The stored procedure may tie each parameter marker to its real data when the stored procedure issues a DB2 OPEN command for the cursor. This may be performed by connecting the real data in FIG. 5 to those parameter markers (the question marks) in 430. The way the program makes the connection involves telling the DB2 OPEN command to look in a specific storage area of the program. It is this storage area that holds the real data for each of the parameter markers.

As shown in FIG. 3, QUERY_VALUES input parameter may contain one or more groups made up of a column name and its value, as shown at 314. For example, the first group contains column name TEL_CITY and its value is MIAMI. After parsing the column name and value into separate fields, stored procedure CIFSP003 may then map the value of 'MIAMI' to the Typed Parameter Marker that corresponds to column TEL_CITY. It repeats this mapping for all groups in the QUERY_VALUES field.

For example, as the stored procedure retrieves the SQL statements that make up the cursor (e.g., 422), it checks each line for the presence of a parameter marker (the question mark). Fields 430 contains three such parameter markers.

Figure 5:
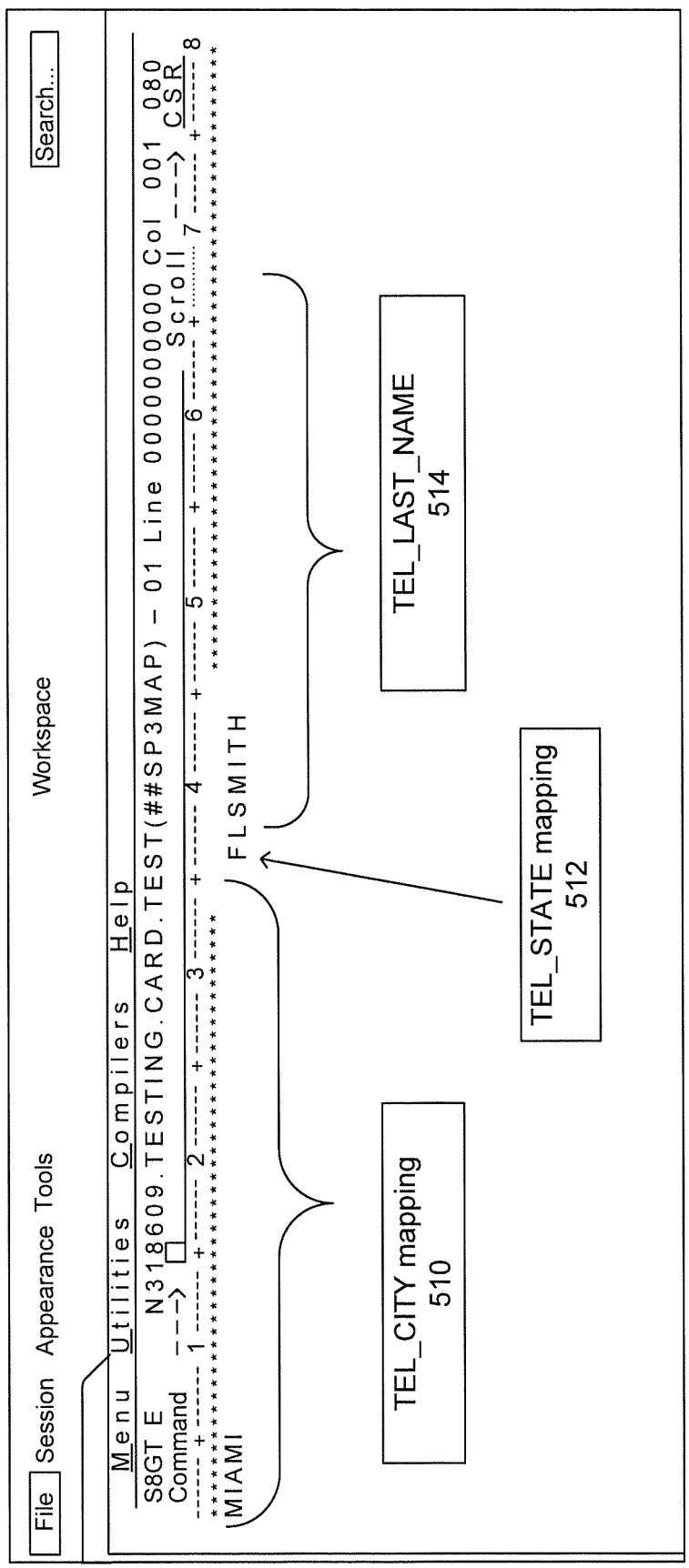
FIG. 5 is an exemplary illustration of a dynamic stored procedure tool interface, according to an embodiment of the present invention.

FIG. 5 is an exemplary illustration of a dynamic stored procedure tool interface, according to an embodiment of the present invention. Stored procedure CIFSP003 may build the mapping based on the order of the Type Parameter Markers that are found in the query. In this example, the values for TEL_CITY, as shown by 510, TEL_STATE as shown by 512, and TEL_LAST_NAME, as shown by 514, appear in the same order as their Typed Parameter Markers.

The mapping shown in FIG. 5 is representative of how the actual values may appear in the stored procedure CIFSP003's working-storage when it prepares to execute the query. For example, even though the name 'MIAMI' is just five letters long, it will occupy 35 bytes when mapped for the query. This is because the CAST statement for its Typed Parameter Marker specified that size: CAST(? AS CHAR (00035)), shown at 430. More specifically, when the stored procedure detects the first parameter marker in Fields 430, it is able to match the TEL_CITY in Item 422 to the TEL_CITY in 314. The first parameter marker in 430 indicates that 35 bytes of storage needs to be reserved for the data value that will be mapped to TEL_CITY in the cursor. Namely, the "CHAR(00035)" indicates that the column will hold character data and that it may be as large as 35 bytes long.

At this point, data value from the "TEL_CITY=MIAMI;" combination is placed in the next available position of the specific storage area that the DB2 OPEN command will use later on. Since the parameter marker for TEL_CITY was the first one, the next available position is actually the start of the storage area shown in FIG. 5. Item 510 represents the real data value ("MIAMI") that is mapped to the first parameter marker in Fields 430. The remaining parameter markers may be processed in a similar manner. TEL_STATE=FL; in Item 314 will end up mapping the second parameter marker in Item 430 to the real data value ("FL") in item 512. TEL_LAST_NAME=SMITH; in Item 314 will end up mapping the third parameter marker in Item 430 to the real data value ("SMITH") in Item 514.

FIG. 6 is an exemplary illustration of a result set interface, according to an embodiment of the present invention. FIG. 6 represents a sample result set produced by the query. As shown, the result set includes telephone number, first name, last name, street address, city, state and zip code.

FIGS. 3-6 illustrate a simplified example of an embodiment of the present invention. The various embodiments of the present invention may be applied to other applications, including queries performed on customer accounts by a financial institution. Other applications, services and scenarios may be implemented.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A computer implemented system that implements a dynamic stored procedure tool, the system comprising:
   a memory interface that accesses a dedicated DB2 table containing a plurality of cursors, each of the plurality of cursors including a set of SQL statements;
   an interactive interface that receives a user selection;
   a processor, coupled to the memory interface and the interactive interface, the processor configured to perform operations, including
      receive an invocation of a stored procedure from a calling application from among a plurality of applications;
      receive two input values from the calling application, the first input value is a cursor ID and the second input value includes a list of values including inputs that define a query for the stored procedure that are required for invocation of a cursor identified by the cursor ID; and
      execute the stored procedure, the execution including
         retrieve in real time the cursor identified by the cursor ID dynamically from the plurality of cursors in the dedicated DB2 table, wherein the dedicated DB2 table is external to the stored procedure;
         review each line of the set of SQL statements including the retrieved cursor identified by the cursor ID for the presence of one or more parameter markers;
         upon identifying the presence of one or more parameter markers, map the one or more parameter markers with the list of values from the calling application where the mapping is based on the order of the one or more parameter markers found in the set of SQL statements; and
         execute the retrieved cursor dynamically on a data source designated by the retrieved cursor, with the list of values from the calling application mapped to the one or more parameter markers to generate a first result table based on the first list of values from the calling application,
   wherein an external source stores the set of SQL statements that make up the retrieved cursor, and
   wherein upon completion of the executed stored procedure other applications from the plurality of applications continue to use an original cursor.

2. The computer implemented system of claim 1, wherein the cursor comprises a plurality of read only SQL statements.

3. The computer implemented system of claim 1, wherein the external source comprises a dedicated table that stores the data needed to build and execute a query.

4. The computer implemented system of claim 1, wherein the input values comprise a query identifier that identifies a starting point for building a query.

5. The computer implemented system of claim 1, wherein the input values comprise one or more query values that supply the names and values for dynamic parameter substitution at run-time.

6. The computer implemented system of claim 4, wherein the query defines parameters, a table, one or more conditions and an order.

7. The computer implemented system of claim 4, wherein the query identifies one or more typed parameter markers.

8. The computer implemented system of claim 7, wherein a mapping between the typed parameter markers and actual data from the calling program is generated.

9. The computer implemented system of claim 1, wherein the cursor is used to generate a result set.

10. A computer implemented method that implements a dynamic stored procedure tool, the method comprising:

receiving an invocation of a stored procedure from a calling application;

receiving, via a processor, two input values from the calling application, the first input value is a cursor ID and the second input value includes a list of values including inputs that define a query for the stored procedure that are required for invocation of a cursor identified by the cursor ID; and executing the stored procedure, the execution including retrieving in real time, via the processor, the cursor identified by the cursor ID dynamically from the plurality of cursors in the dedicated DB2 table, wherein the dedicated DB2 table is external to the stored procedure;

reviewing, via the processor, each line of the set of SQL statements including the retrieved cursor identified by the cursor ID for the presence of one or more parameter markers;

upon identifying the presence of one or more parameter markers, mapping, via the processor, the one or more parameter markers with the list of values from the calling application where the mapping is based on the order of the one or more parameter markers found in the set of SQL statements; and executing, via the processor, the retrieved cursor dynamically on a data source designated by the cursor, with the list of values from the calling application mapped to the one or more parameter markers to generate a first result table based on the first list of values from the calling application, wherein an external source stores the set of SQL statements that make up the retrieved cursor, and wherein upon completion of the executed stored procedure other applications from the plurality of applications continue to use an original cursor.

11. The computer implemented method of claim 10, wherein the cursor comprises a plurality of read only SQL statements.

12. The computer implemented method of claim 10, wherein the external source comprises a dedicated table that stores the data needed to build and execute a query.

13. The computer implemented method of claim 10, wherein the input values comprise a query identifier that identifies a starting point for building a query.

14. The computer implemented system of claim 10, wherein the input values comprise one or more query values that supply the names and values for dynamic parameter substitution at run-time.

15. The computer implemented method of claim 13, wherein the query defines parameters, a table, one or more conditions and an order.

16. The computer implemented system of claim 13, wherein the query identifies one or more typed parameter markers.

17. The computer implemented method of claim 16, wherein a mapping between the typed parameter markers and actual data from the calling program is generated.

18. The computer implemented system of claim 10, wherein the cursor is used to generate a result set.

* * * * *